(12) United States Patent
Valle

(10) Patent No.: US 10,458,495 B2
(45) Date of Patent: Oct. 29, 2019

(54) METHOD FOR MANUFACTURING A BRAKE DISC, SUPPORT BELL FOR A BRAKE DISC AND BRAKE DISC

(71) Applicant: FRENI BREMBO S.P.A. O ANCHE PIU' BREVEMENTE BREMBO S.P.A., Curno, Bergamo (IT)

(72) Inventor: Massimiliano Valle, Milan (IT)

(73) Assignee: FRENI BREMBO S.P.A. O ANCHE PIU' BREVEMENTE BREMBO S.P.A., Curno, Bergamo (IT)

( * ) Notice: Subject to any disclaimer, the term of this patent is extended or adjusted under 35 U.S.C. 154(b) by 628 days.

(21) Appl. No.: 14/350,882

(22) PCT Filed: Oct. 10, 2012

(86) PCT No.: PCT/IB2012/055468
§ 371 (c)(1),
(2) Date: Apr. 10, 2014

(87) PCT Pub. No.: WO2013/054264
PCT Pub. Date: Apr. 18, 2013

(65) Prior Publication Data
US 2014/0251740 A1    Sep. 11, 2014

(30) Foreign Application Priority Data

Oct. 10, 2011    (EP) .................................... 11425246

(51) Int. Cl.
*F16D 65/12*    (2006.01)
*B21D 22/20*    (2006.01)
*B21D 53/88*    (2006.01)
*F16D 65/02*    (2006.01)

(52) U.S. Cl.
CPC ............. *F16D 65/12* (2013.01); *B21D 22/20* (2013.01); *B21D 53/88* (2013.01); *F16D 2065/1316* (2013.01); *F16D 2250/0023* (2013.01); *Y10T 29/49826* (2015.01)

(58) Field of Classification Search
CPC ..... F16D 2065/1316; F16D 2250/0023; B21D 22/20; B21D 53/88
See application file for complete search history.

(56) References Cited

U.S. PATENT DOCUMENTS 1,546,656 A * 7/1925 Hansen .................. B21D 53/34
29/894
1,651,111 A * 11/1927 Winter ................... B21D 22/26
29/894.325

(Continued)

FOREIGN PATENT DOCUMENTS

DE            3012420 A  * 10/1981  .............. B60B 27/00
DE            3012420 A1    10/1981
WO       WO 9321453 A1 * 10/1993  ........... F16D 65/123

*Primary Examiner* — Xuan Lan Nguyen
(74) *Attorney, Agent, or Firm* — Merchant & Gould P.C.

(57) ABSTRACT

A method for manufacturing a composite brake disc (1), comprising shaping a bell (2) through deep-drawing of a metal sheet (20), forming at least one groove (22) in a surface of a bottom portion (24) of the metal sheet (20) and, then, pushing the bottom portion (24) relative to an outer portion (25) in a retro-forming direction (23) opposite the drawing direction (20), connecting, a brake band (3) to the bell (2).

18 Claims, 10 Drawing Sheets

(56) References Cited

U.S. PATENT DOCUMENTS

| | | | | |
|---|---|---|---|---|
| 4,055,068 A | * | 10/1977 | Lucas | B21K 1/28 |
| | | | | 29/894.324 |
| 4,126,492 A | * | 11/1978 | Okunishi | B21D 53/34 |
| | | | | 148/534 |
| 4,166,521 A | | 9/1979 | Nakaji | |
| 4,356,717 A | * | 11/1982 | Okunishi | B21K 1/32 |
| | | | | 72/334 |
| 4,741,194 A | | 5/1988 | Kozyra | |
| 2007/0284200 A1 | | 12/2007 | Hampton | |

* cited by examiner

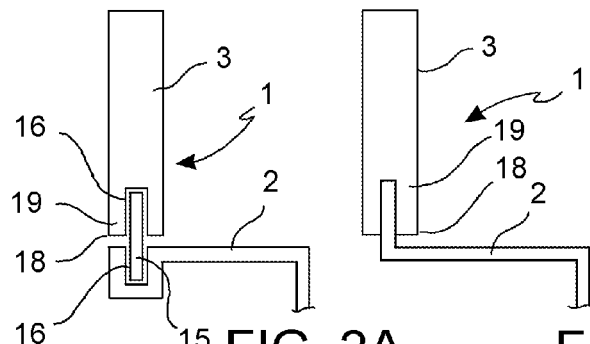
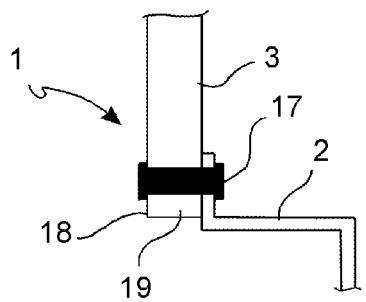
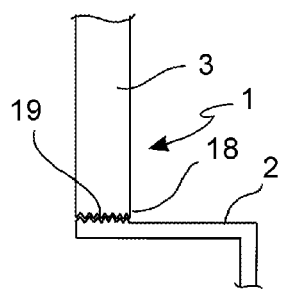
FIG. 2A  FIG. 2B
FIG. 2C  FIG. 2D
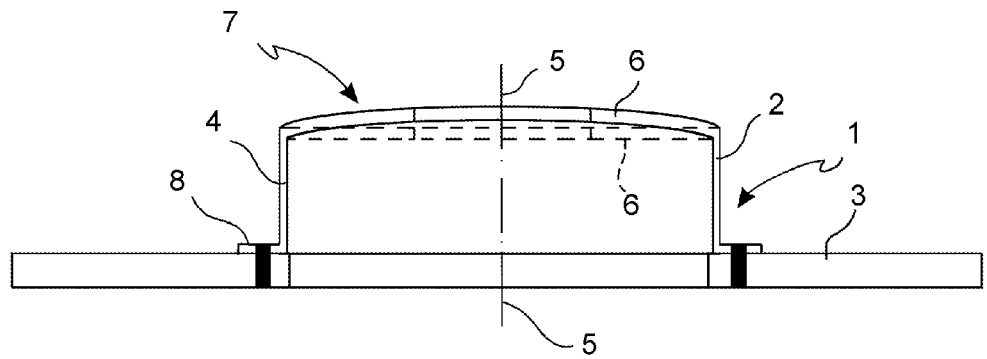
FIG. 1

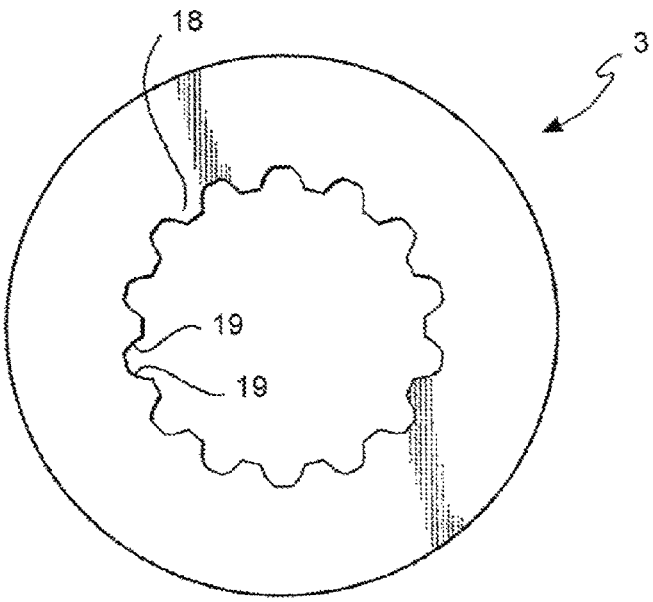

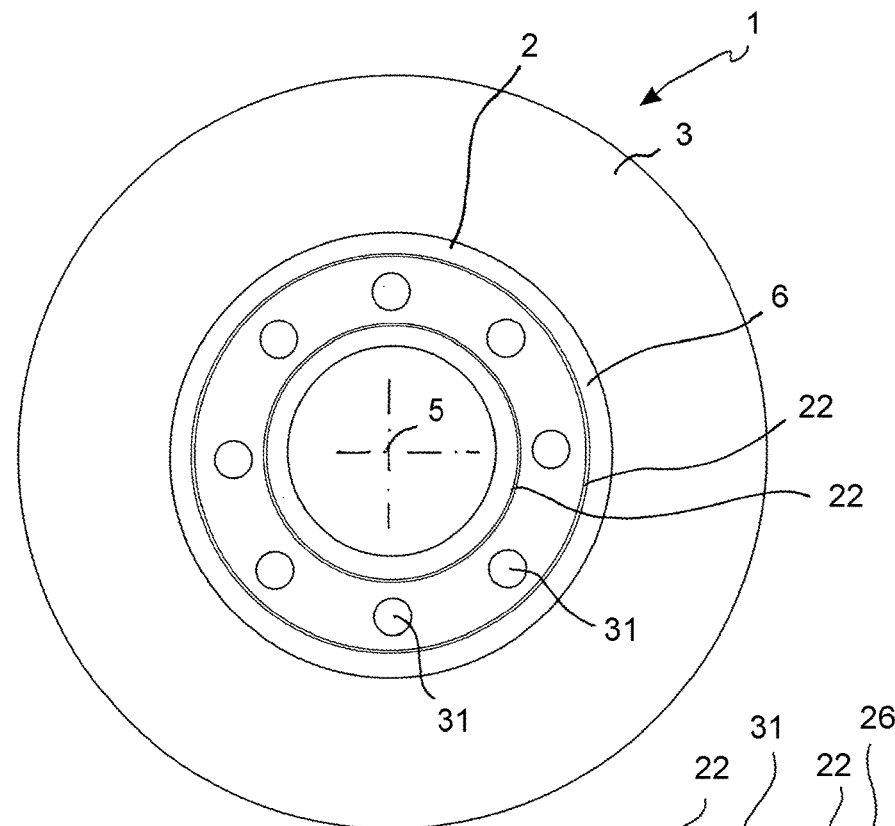
FIG. 4A
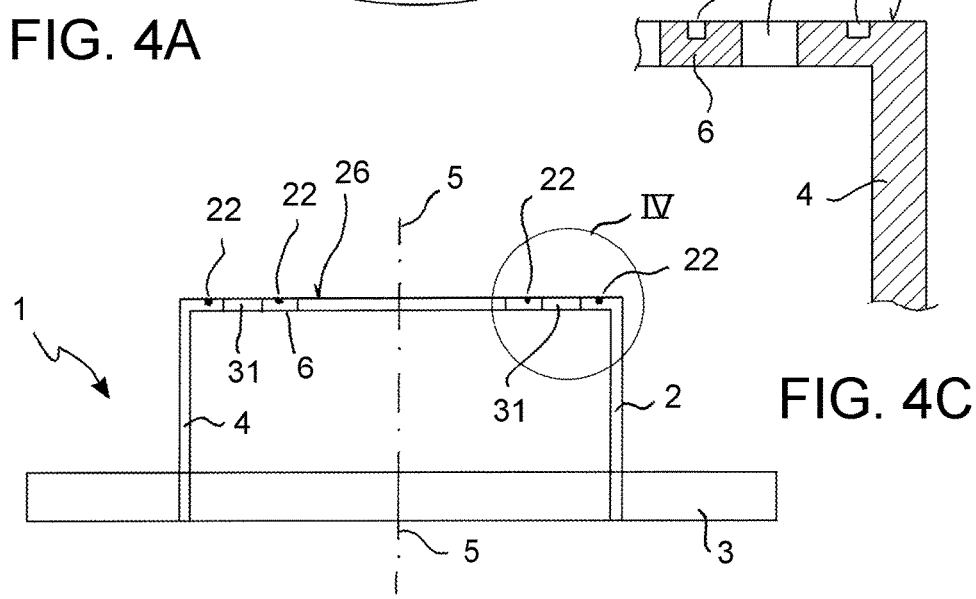
FIG. 4B
FIG. 4C

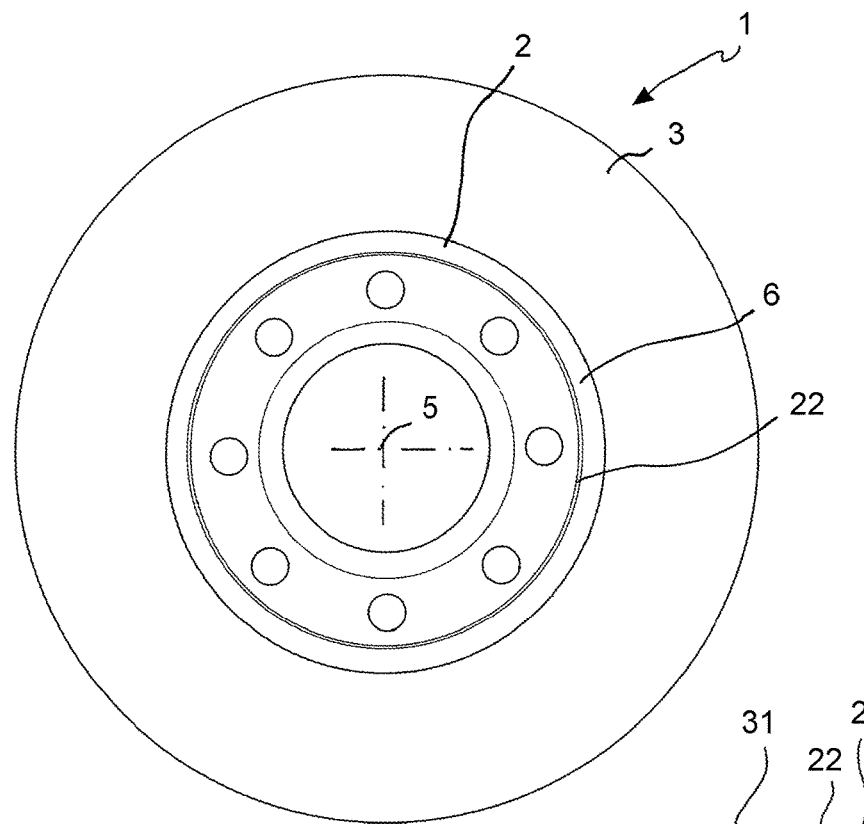
FIG. 5A
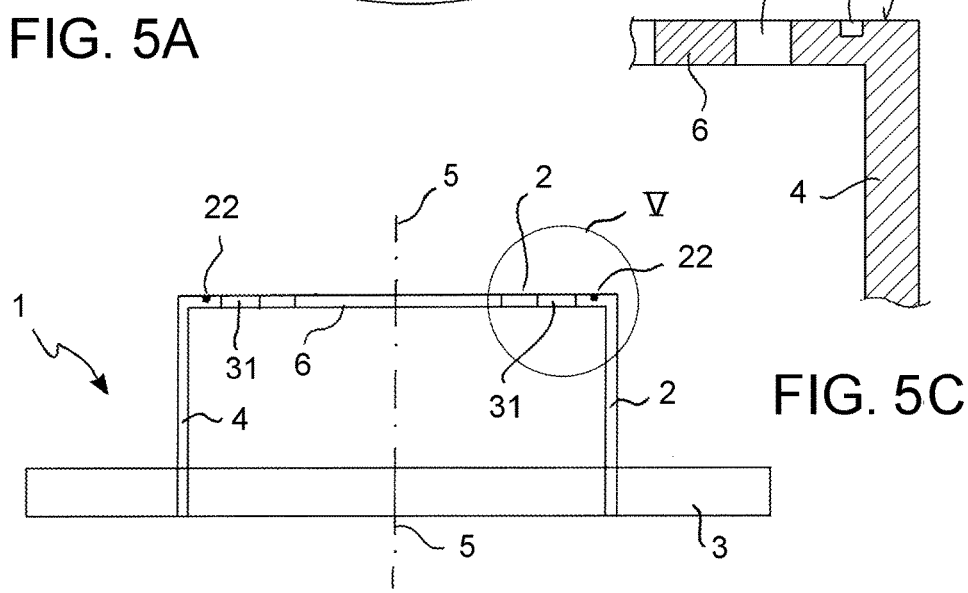
FIG. 5B
FIG. 5C

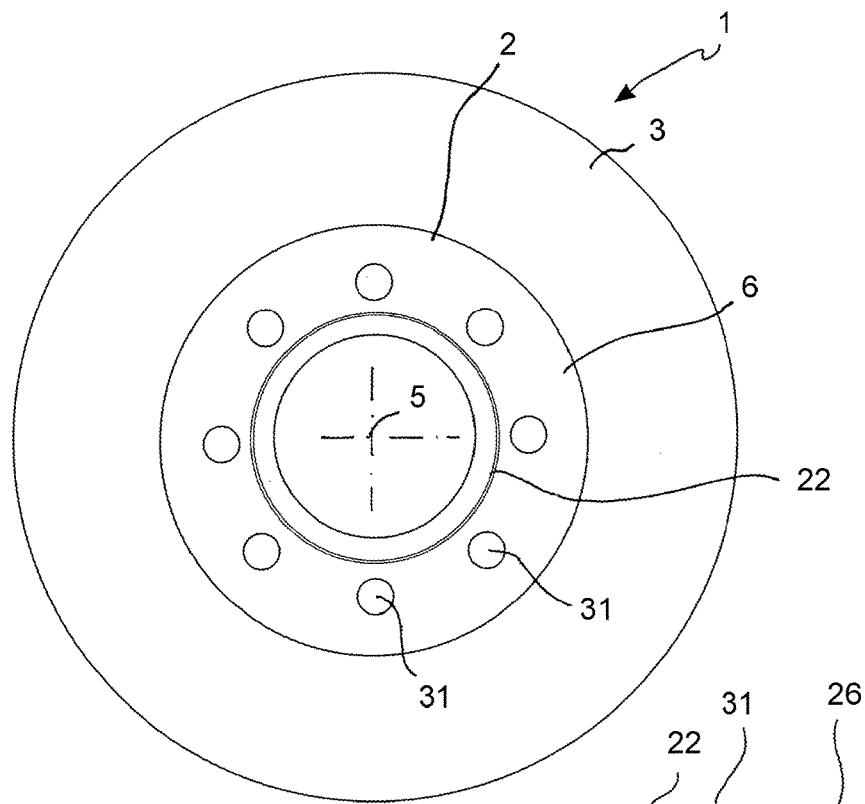
FIG. 6A
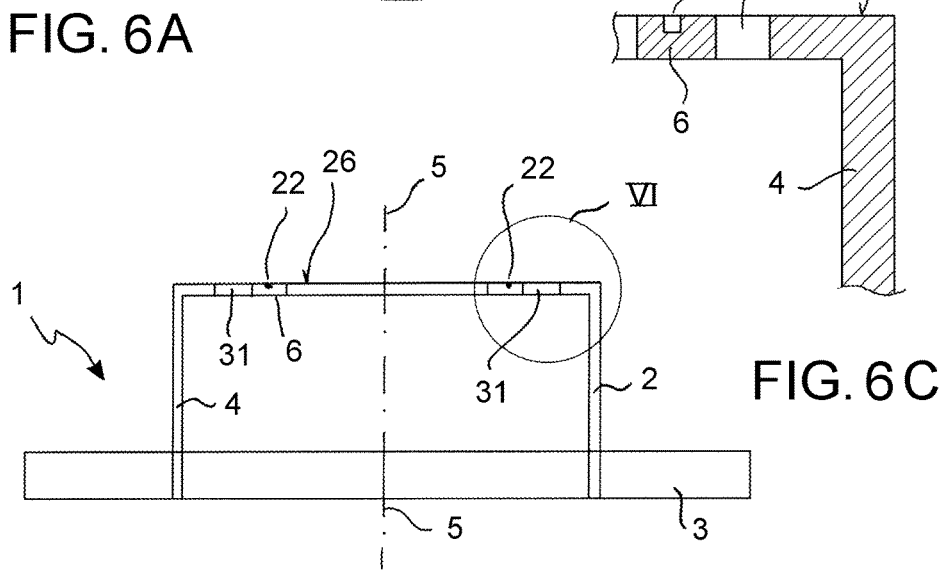
FIG. 6B
FIG. 6C

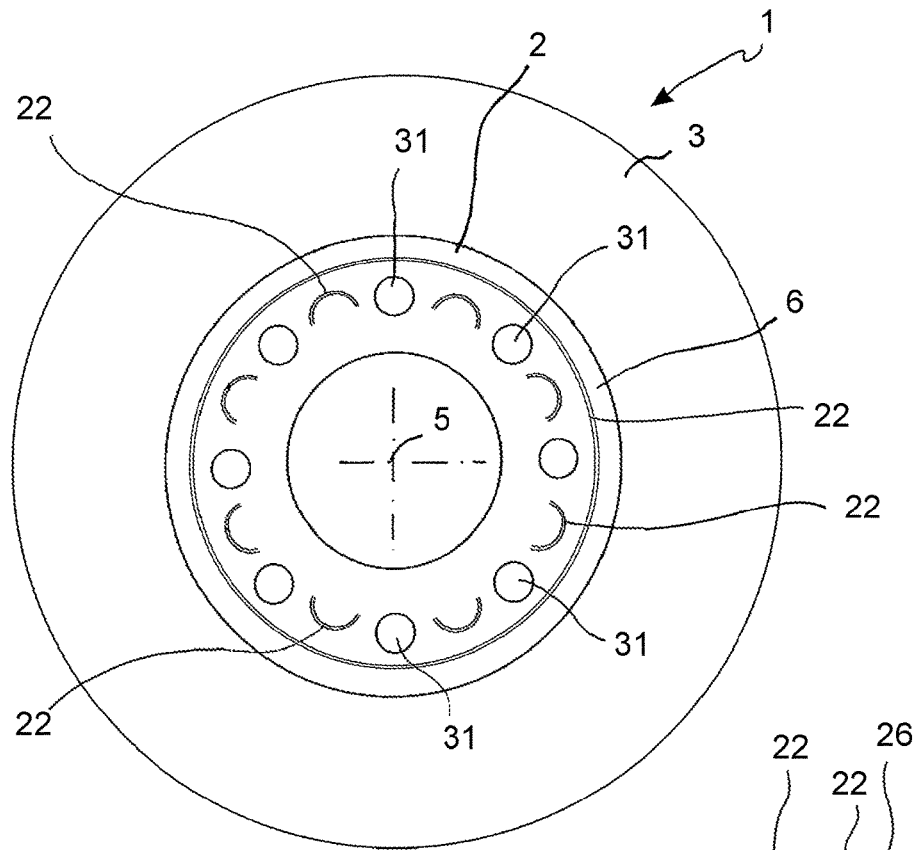
FIG. 8A
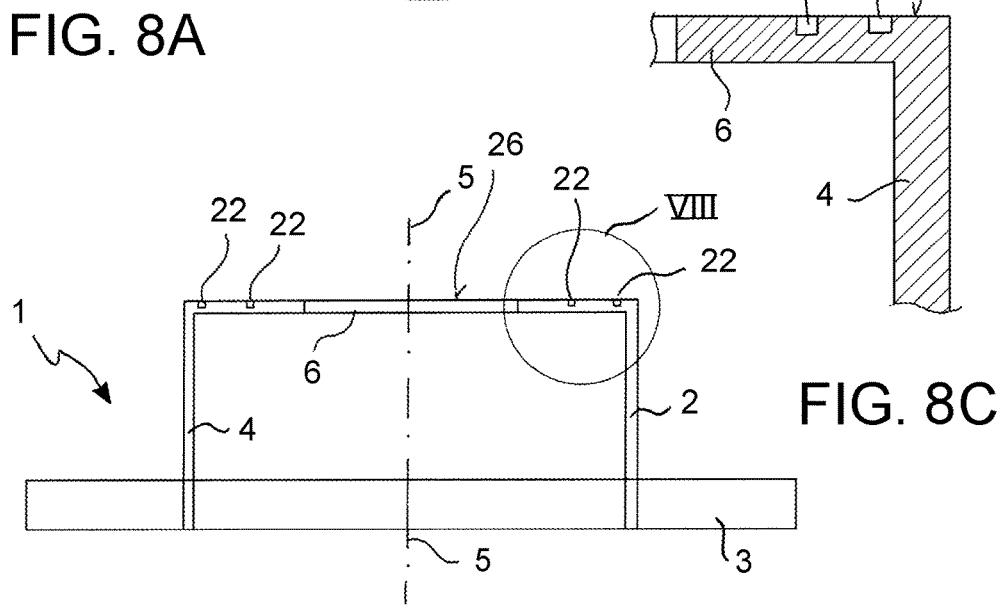
FIG. 8C
FIG. 8B

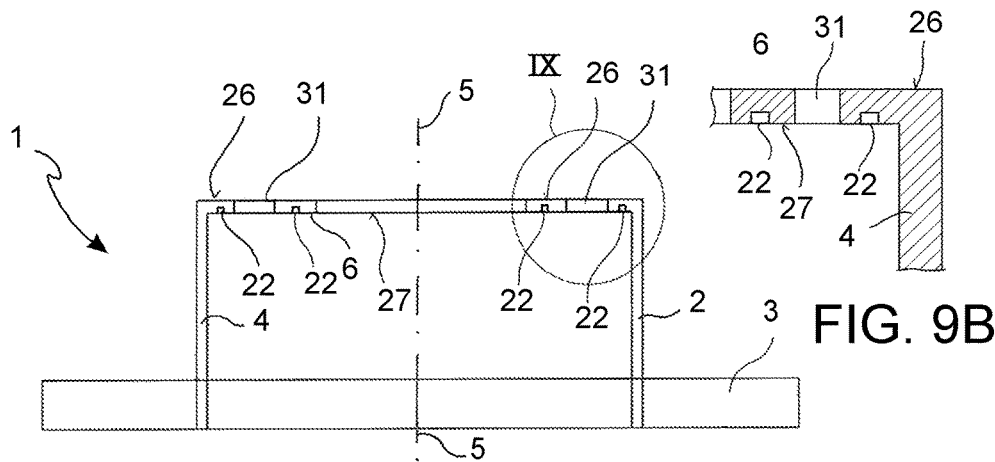
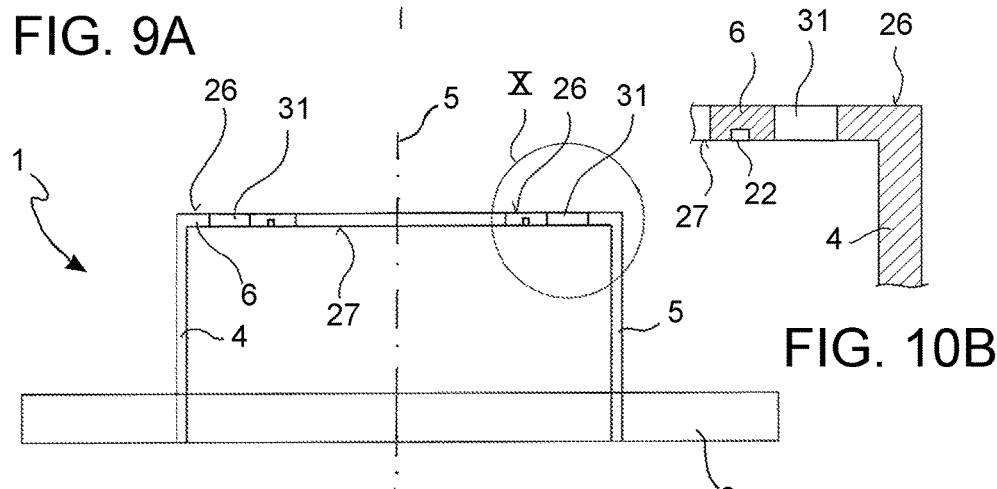
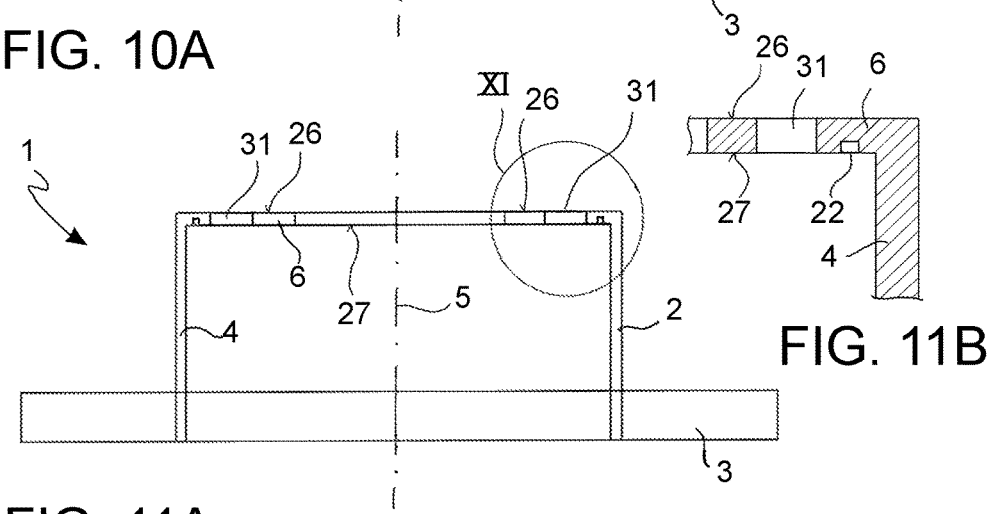

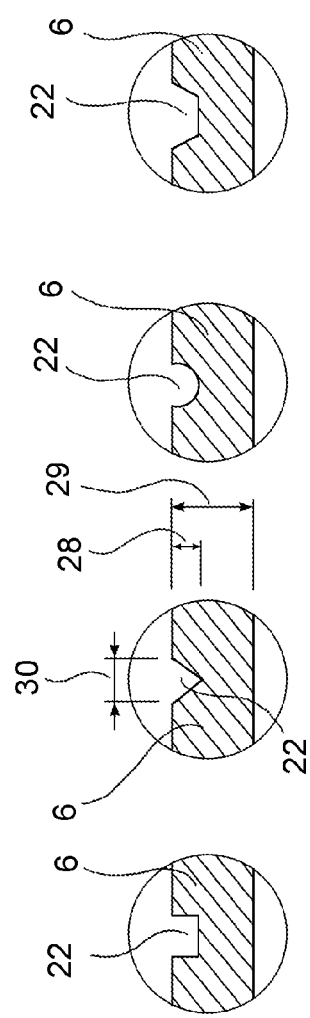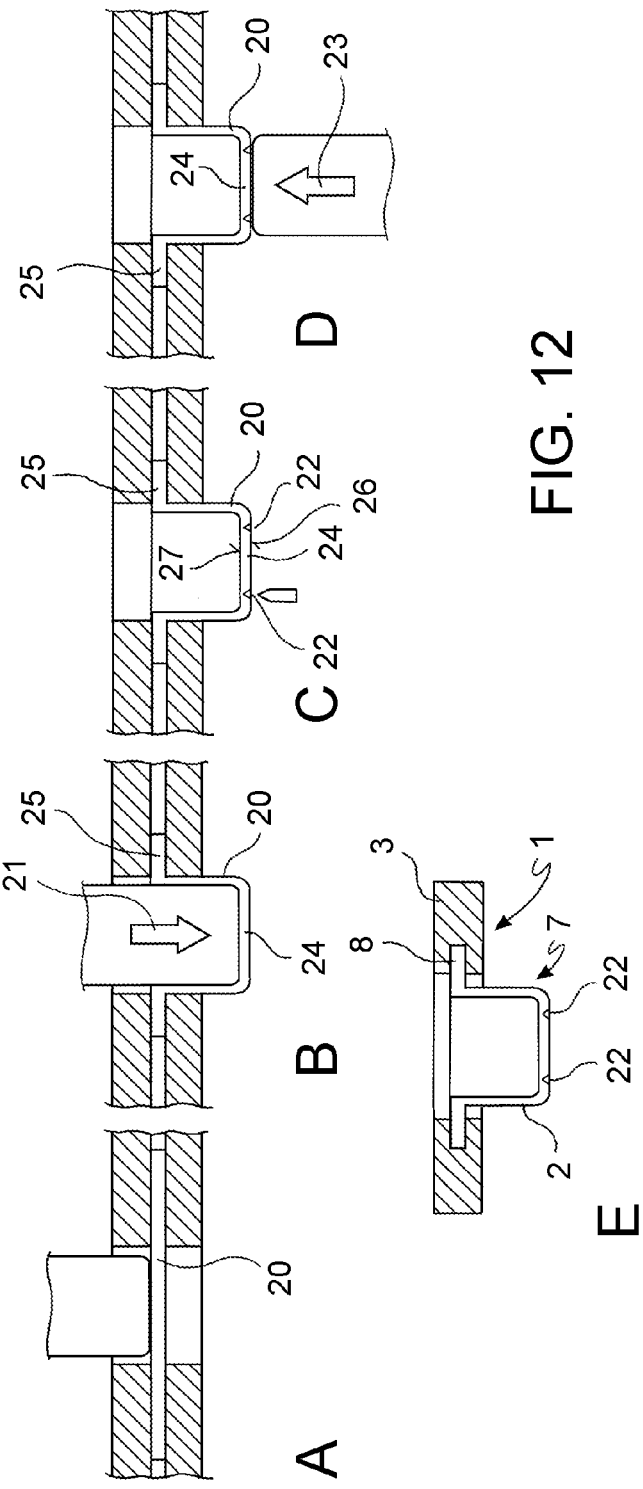
FIG. 13A  FIG. 13B  FIG. 13C  FIG. 13D
FIG. 12

METHOD FOR MANUFACTURING A BRAKE DISC, SUPPORT BELL FOR A BRAKE DISC AND BRAKE DISC

CROSS-REFERENCE TO RELATED APPLICATION

This application is the 35 U.S.C § 371 national stage of PCT Application No. PCT/IB2012/055468, filed Oct. 10, 2012, which is herein incorporated by reference in its entirety and which also claims priority to, and the benefit of, European Patent Application 11425246.3, filed Oct. 10, 2011, which is herein incorporated by reference in its entirety.

The object of the present invention is a method for manufacturing a composite brake disc for motorised vehicles, in other words a brake disc the brake band and support bell of which are made from different materials. A support bell for a composite disc and a composite brake disc also form objects of the present invention.

Composite brake discs are generally known, for example from US2007/0284200A1. Thanks to the separation of the brake band from the support bell, composite brake discs make it possible to optimise each component for the specific use (mechanical, thermal and tribological stresses) with reference both to the material and to the method for obtaining it. It is therefore possible to combine for example a brake band made from cast iron having excellent tribological and heat conductivity characteristics, with a support bell made from sheet steel having high mechanical strength and low weight.

Support bells of the prior art have a coupling portion suitable for the connection of the bell to the brake band and a hub connection portion suitable for the connection of the bell to a hub of a vehicle. The coupling portion is generally formed along a radially outer circumference of the bell and the hub connection portion usually extends radially inside the coupling portion and has the shape of a cup with a tubular side wall concentric to a rotation axis of the brake disc and a bottom wall transversal or perpendicular to the rotation axis. The hub connection portion of the bell is intended to be inserted onto the hub of a vehicle's suspension, so that the engagement between the side wall with a cylindrical outer surface of the hub ensures the concentricity between the hub and the brake disc relative to the rotation axis and the engagement of the bottom wall with a front surface of the hub ensures the correct axial positioning of the brake disc relative to the suspension, to the brake caliper and to the wheel. In order to lock the connection between the bell, the hub and the wheel of the vehicle, the bottom wall of the bell can have a plurality of holes for the passage of screws that can be screwed in corresponding internally threaded holes in the front surface of the hub.

With particular reference to composite brake discs with a support bell made of sheet steel, a known manufacturing method foresees making the bell through blanking of the sheet steel and subsequent cold deep-drawing of the sheet so as to give the bell its "cup" shape.

Such a known method has the drawback that the bottom wall of the bell is at least slightly crowned in the drawing direction (as indicated by the continuous line in FIG. 1) instead of being flat and perpendicular to the rotation axis (broken line in FIG. 1).

Such curvature of the bottom wall results in an undesired lack of geometric complementarity between the hub of the vehicle and the bell of the brake disc and it tends to also deform the brake band connected to the bell.

In order to reduce the negative effects of the non-flatness of the bottom wall of the bell, it has been proposed to clamp the entire composite disc, immediately after its assembly and until the disc is mounted on a vehicle, between two large steel plates that have been screwed together in order to maintain the desired flatness. However, this solution involves undesired costs for mounting and dismounting the plates as well as an increase in volumes and weights to be stored and transported.

The purpose of the present invention is therefore to propose a method for manufacturing a composite brake disc having characteristics such as to avoid at least some of the quoted drawbacks with reference to the prior art.

A particular purpose of the invention is to propose a method for manufacturing a composite brake disc, in which the bell is shaped through drawing, and in which a bottom wall of the bell is less subject to crowning.

A further particular purpose of the invention is to propose a method for manufacturing a composite brake disc, in which the bell is shaped through drawing, and in which the bell is less subject to phenomena of partial reversibility of the deformations obtained through drawing.

A further purpose of the invention is to propose a bell for a composite brake disc and a composite brake disc having characteristics such as to avoid the quoted drawbacks with reference to the prior art.

These and other purposes are accomplished through a method, through a support bell for a composite brake disc, and through a composite brake disc.

According to an aspect of the invention, a method for manufacturing a composite brake disc comprises the steps of:
shaping a support bell in the form of a cup with a tubular side wall and a bottom wall transversal to the side wall through deep-drawing of a metal sheet, in which a bottom portion of the metal sheet that will form the bottom wall is pushed in a drawing direction relative to an outer portion of the metal sheet that will form a coupling portion for the connection of the bell to a brake band;
forming at least one groove in a surface of the bottom portion of the metal sheet and, then, pushing the bottom portion relative to the outer portion in a retro-forming direction opposite to the drawing direction;
connecting the brake band with the coupling portion of the support bell.

Thanks to the fact that a groove is made in the surface of the bottom portion of the metal sheet and that there is subsequent pushing in the opposite direction to the drawing direction, the material of the bottom wall yields at least locally at the surface and undergoes a plastic deformation in an opposite direction to that obtained through deep-drawing and, surprisingly, it involves a substantial reduction in crowning and a high flatness of the bottom wall of the bell thus obtained.

This makes it possible to obtain a more precise geometric complementarity between the bell of the brake disc and the hub of the vehicle's suspension, avoids undesired deformations of the brake band when it is constrained to the bell and makes it possible to eliminate the additional measures to keep the entire composite brake disc "straight" during storage and transportation before it is mounted on the vehicle.

In order to better understand the invention and to appreciate its advantages, some non-limiting example embodiments will be described hereafter, which have been illustrated in the attached drawings, in which:

FIG. 1 is a schematized section view of a composite brake disc, in which a flat shape of a bottom wall of the bell is indicated by broken lines and an undesired crowned shape of such a bottom wall is indicated by continuous lines;

FIGS. 2A to 2D are schematized partial section views of connection areas between a bell and a brake band of a composite brake disc;

FIGS. 3A to 3C illustrate a brake band for a composite brake disc in a front, side and section view according to the section plane C-C;

FIG. 4A is a front view of a composite brake disc according to a first embodiment of the invention;

FIG. 4B is a radial section view of the brake disc in FIG. 4A;

FIG. 4C is an enlarged view of the detail IV in FIG. 4B;

FIG. 5A is a front view of a composite brake disc according to a second embodiment of the invention;

FIG. 5B is a radial section view of the brake disc in FIG. 5A;

FIG. 5C is an enlarged view of the detail V in FIG. 5B;

FIG. 6A is a front view of a composite brake disc according to a third embodiment of the invention;

FIG. 6B is a radial section view of the brake disc in FIG. 6A;

FIG. 6C is an enlarged view of the detail VI in FIG. 6B;

FIG. 8A is a front view of a composite brake disc according to a fifth embodiment of the invention;

FIG. 8B is a radial section view of the brake disc in FIG. 8A;

FIG. 8C is an enlarged view of the detail VIII in FIG. 8B;

FIG. 9A is a radial section view of a brake disc according to a sixth embodiment of the invention;

FIG. 9B is an enlarged view of the detail IX in FIG. 9A;

FIG. 10A is a radial section view of a brake disc according to a seventh embodiment of the invention;

FIG. 10B is an enlarged view of the detail X in FIG. 10A;

FIG. 11A is a radial section view of a brake disc according to an eighth embodiment of the invention;

FIG. 11B is an enlarged view of the detail XI in FIG. 11A;

FIG. 12 is a schematized representation of steps A, B, C, D, and of a method for manufacturing a composite brake disc according to an embodiment of the invention;

FIGS. 13A to 13D are cross section views of grooves in a bottom wall of a bell for a brake disc according to embodiments of the invention.

Figure 7A:
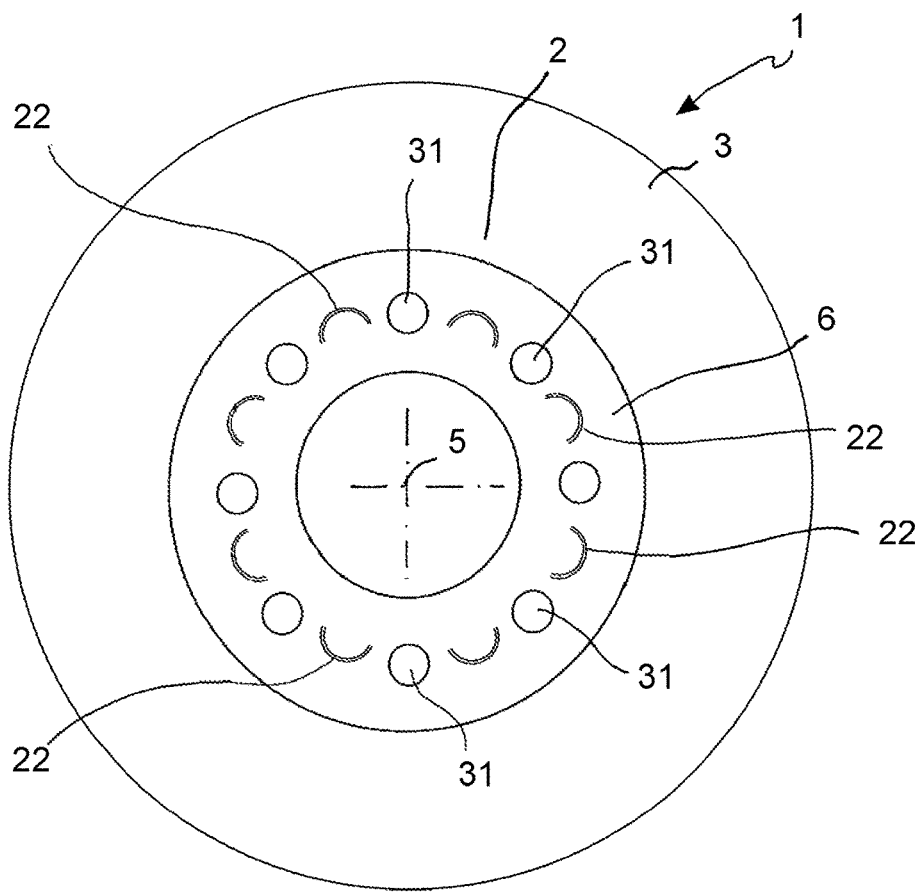
FIG. 7A is a front view of a composite brake disc according to a fourth embodiment of the invention.
Figure 7B:
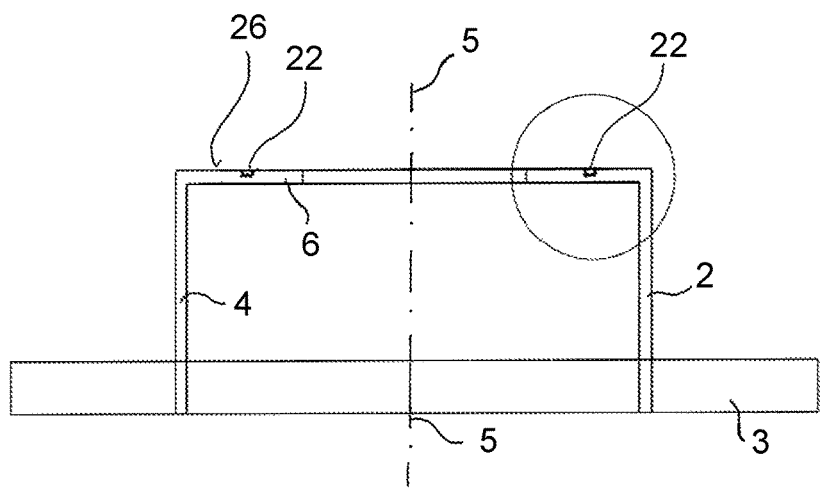
FIG. 7B is a radial section view of the brake disc in FIG. 7A.

With reference to the figures, a composite brake disc is wholly indicated with reference numeral 1 and comprises a bell 2 made from a first material, preferably metal sheet, in particular sheet steel or aluminium alloy, and a brake band 3 made from a second material, for example cast iron, aluminium alloy or ceramic material reinforced with fibres.

The bell 2 has a connection portion 7 for the connection of the brake disc 1 to a hub of a vehicle and a coupling portion 8 for the connection of the bell 2 to the brake band 3. The connection portion 7 of the bell 2 is shaped like a cup with a tubular side wall 4 substantially concentric with a rotation axis (and, usually, axis of symmetry) 5 of the brake disc 1 and a bottom wall 6 transversal to the side wall 4 and preferably substantially perpendicular to the rotation axis 5. The coupling portion 8 is usually formed at an end of the side wall 4 opposite the bottom wall 6.

The brake band 3 (FIG. 3A-3C) has two opposite friction surfaces 9, formed in a full pad or, alternatively, in two pads 10 connected through connection elements 11 and defining internal ventilation channels 12 between them that extend from radially inner inlet openings 13 up to radially outer outlet openings 14 of the brake band 3. At an inner perimeter 18 thereof, the brake band 3 forms a coupling portion 19 for the connection with the coupling portion 8 of the bell 2.

In accordance with embodiments of the invention, the coupling between the bell 2 and the brake band 3 can be, for example:

a geometric coupling through pins 15 or radially extending projections that engage corresponding pin seats 16 so as to transmit the braking torque from the brake band 3 to the bell 2 and to allow an, although limited, radial thermal expansion of the brake band 3 relative to the bell 2 (FIG. 2A);

a geometric coupling through screwing of the brake band 3 on the bell 2 (FIG. 2D), a connection through screws 17 or bolts (FIG. 2C);

According to the invention, the method for manufacturing the composite brake disc (FIGS. 12 A-E) comprises the steps of:

shaping a bell 2 in the form of a cup with a tubular side wall 4 and a bottom wall 6 transversal to the side wall 4 through deep-drawing of a metal sheet 20, in which a bottom portion 24 of the metal sheet 20 that will form the bottom wall 6 is pushed in a drawing direction 21 relative to an outer portion 25 of the metal sheet 20 that will form a coupling portion 8 for the connection of the bell 2 to a brake band 3;

forming at least one groove 22 in a surface of the bottom portion 24 of the metal sheet 20 and, then, pushing the bottom portion 24 relative to the outer portion 25 in a retro-forming direction 23 opposite to the drawing direction 20;

connecting the brake band 3 to the coupling portion 8 of the bell 2.

Thanks to the fact that a groove 22 is made in the surface of the bottom portion of the metal sheet and there is subsequent pushing in the opposite direction to the drawing direction, the material of the bottom wall 6 yields at least locally at the surface and undergoes a plastic deformation in the opposite direction to that obtained through deep-drawing and, surprisingly, it involves a substantial reduction in crowning and, therefore, a high flatness of the bottom wall 6 of the bell 2 thus obtained.

This makes it possible to obtain a more precise geometric complementarity between the bell 2 of the brake disc 1 and the hub of the vehicle's suspension, to reduce undesired deformations of the brake band when it is constrained to the bell and to eliminate the additional operations to keep the entire composite brake disc "straight" during storage and transportation before it is mounted on the vehicle.

In accordance with an embodiment, the step of pushing the bottom portion 24 relative to the outer portion 25 of the drawn sheet in the retro-forming direction 23 comprises the step of imparting a dynamic impact or, in other words, a blow (for example a punch blow or a press blow) on the bottom portion 24.

Such application of a dynamic force has proven to be very effective in making the surface of the sheet yield in the vicinity of the groove or of the grooves 22 and to permanently conserve the shape of the bottom wall 6 thus obtained.

In accordance with embodiments, the blow is imparted on the bottom portion 24 at a speed of forward motion of the punch of between 150 mm/s and 1000 mm/s, for example at a speed of about 500 mm/s.

In accordance with an embodiment, the bottom portion 24 is deformed during the pushing in the retro-forming direction 23 relative to the outer portion 25 of the drawn sheet in a range from 1 mm to 15 mm, preferably from 2 mm to 5 mm, even more preferably by a deformation of less than triple the thickness of the sheet 20 in the bottom portion after deep-drawing.

In accordance with a further embodiment, the step of forming at least one groove 22 in the surface of the bottom portion 24 comprises the step of forming the groove 22 in an outer surface 26 of the bottom wall 6 facing in the drawing direction 21 (FIGS. 4-8).

Alternatively or in addition, the step of forming at least one groove 22 in the surface of the bottom portion 24 can comprise the step of forming a groove 22 in an inner surface 27 of the bottom wall 6 facing in the retro-forming direction 23 (FIGS. 9-11).

In accordance with an embodiment, the groove 22 has a depth 28 that is less than one third of the thickness 29 (indicated in FIG. 13B) of the bottom wall 6, preferably less than one fifth of the thickness 29 of the bottom wall 6. For example, for a bell 2 made from sheet steel with a thickness 29 of 2.5 mm, the depth of the groove 22 is preferably less than or equal to 0.5 mm.

In accordance with a further embodiment, the groove 22 or the plurality of grooves 22 have a width 30 (indicated in FIG. 13B) transversal to their longitudinal extension and perpendicular to their depth 28 within the range from 0.8 to 2.0 times the depth 28.

The grooves themselves can for example have a shape in cross section that is rectangular, preferably with chamfered and rounded corners (FIG. 13A), triangular, preferably with chamfered and rounded corners (FIG. 13B), semi-circular or semi-oval (FIG. 13C) or trapezoidal, preferably with rounded corners (FIG. 13D).

The geometric relationships and the shapes of the grooves 22 have been indicated as non-limiting but advantageous examples with reference to an optimisation both of the mechanical strength and of the precise shaping of the bottom wall of the bell.

The groove or the plurality of grooves 22 are formed through mechanical chip removal machining, for example through milling. Alternatively, the groove or the plurality of grooves 22 are formed through local squashing with plastic deformation of the metal sheet 20, for example through a press or a cutting tool or punch.

The groove 22 can have an annular shape substantially concentric with the rotation axis 5 of the bell 2. The annular groove 22 can extend radially outside (FIG. 5A, FIG. 11A) or radially inside (FIG. 6A, FIG. 10A) of a series of connection holes 31 formed in the bottom wall 6 of the bell 2.

Alternatively, two annular grooves 22 can be formed concentric with the rotation axis 5, one of which is radially outside and the other radially inside the connection holes 31 (FIG. 4A, FIG. 9A). Preferably, the radially inner annular groove 22 is less than one centimetre away from the edge of a central hole of the bottom wall and/or the radially outer annular groove 22 is less than one centimetre from the outer peripheral edge of the bottom wall.

In accordance with a further embodiment, a plurality of grooves 22 (for example in the form of strings, straight lines, curved lines or circle arcs) can be formed in the bottom wall 6 and distributed along a circumference around the rotation axis 5 (FIG. 7A).

In accordance with yet another embodiment (FIG. 8A), a plurality of grooves 22 (for example in the form of strings, straight lines, curved lines or circle arcs) can be formed in the bottom wall 6 and distributed along a circumference around the rotation axis 5 and, in addition, one or more annular grooves 22 concentric with the rotation axis 5.

In accordance with yet another embodiment, one or more straight grooves 22 can be formed in the bottom wall 6, for example extending in the direction radial to the rotation axis 5.

In accordance with embodiments, the groove 22 or the plurality of grooves 22 can be formed after the deep-drawing of the metal sheet 20 or, alternatively, before such deep-drawing.

In accordance with yet another embodiment, the grooves 22 may be replaced or formed by a plurality of distinct cavities or impressions 22 which are provided in the metal sheet 20. The cavities or impressions 22 may have a width in a transverse direction to their longitudinal extension and perpendicular to their depth, said width being comprised in the range from 0.8 to 2.0 times the depth, as well as a length in a transverse direction to the width and perpendicular to the depth, said length being comprises in the range from 0.8 to 2.0 times the depth.

As explained before, the cavities or impressions 22 may be formed by means of mechanical chip removal machining, for example through milling, or through local squashing with plastic deformation of the metal sheet 20, for example through a press or a cutting tool or punch.

Figure 14:
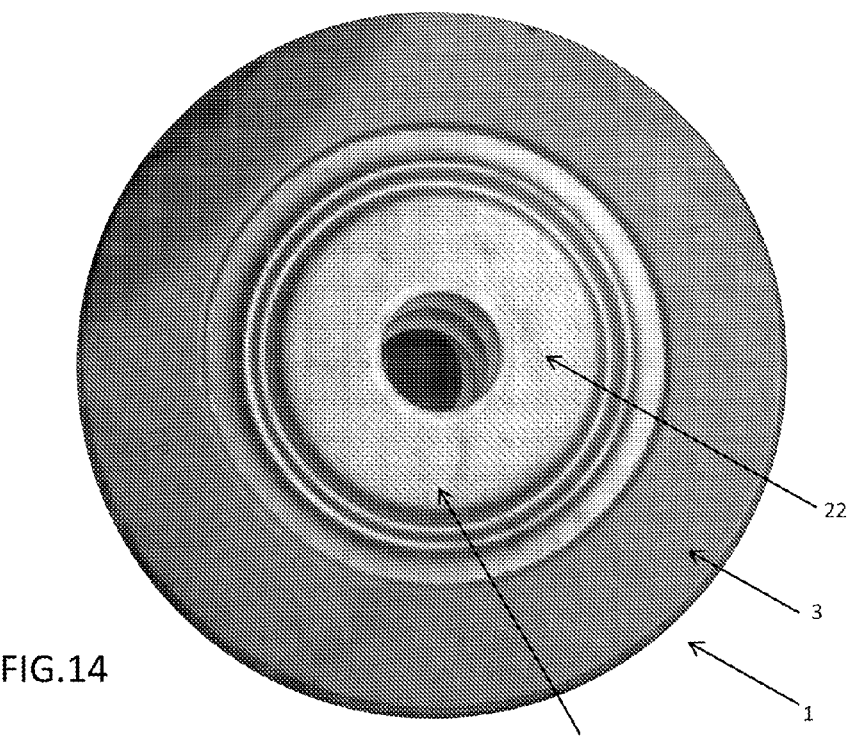
FIGS. 14 and 15 are perspective views of a brake disk manufactured in accordance with an embodiment.
Figure 15:
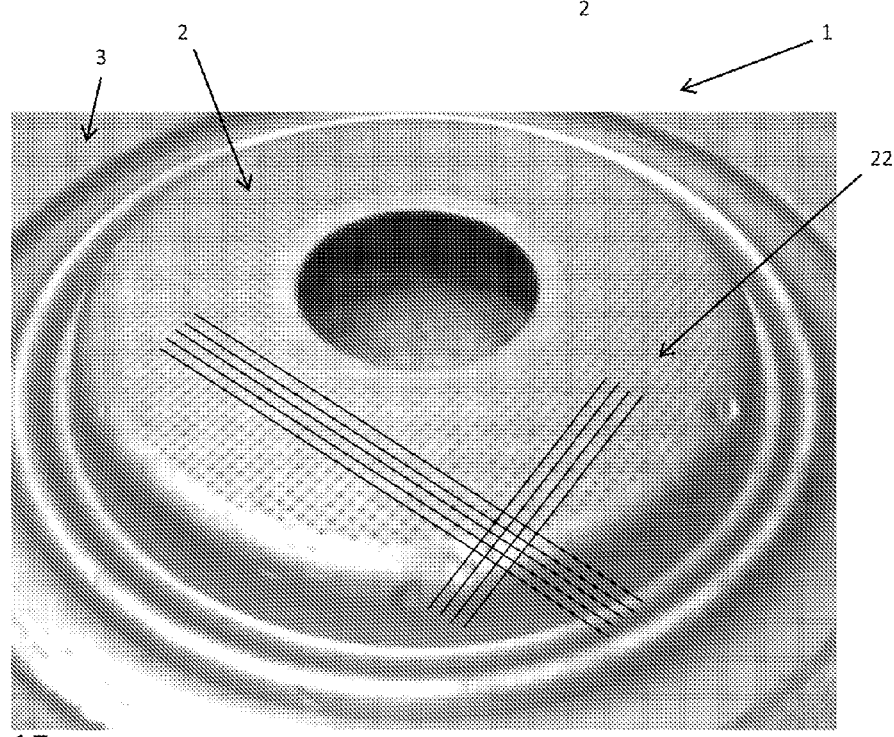

As shown in FIGS. 14 and 15, the cavities or impressions 22 can be uniformly distributed over a ring shaped area of the bottom wall of bell 2, for instance in an array of a plurality of parallel rows.

In each one of the parallel rows of cavities 22 the distance between two consecutive cavities 22 is preferably constant. The array of cavities may further comprise a first plurality of parallel rows of cavities 22 and a second plurality of parallel rows of cavities 22 which are perpendicular to the first plurality of rows of cavities.

The connection holes 31 are made in the bottom wall 6 after the deep-drawing of the metal sheet 20.

In accordance with a further embodiment, the method foresees a step of anti-corrosion treatment of the surface of the metal sheet 20 and, optionally, also of the brake band, for example through zinc-nickel plating. Such anti-corrosion treatment can be carried out after the blanking of the metal sheet 20 and before the deep-drawing and/or after the deformation of the bottom portion 24 of the sheet 20 in the retro-forming direction 23.

The connection of the brake band 3 to the bell 2 can be carried out after the deep-drawing of the metal sheet 20 and before the deformation of the bottom portion 24 of the sheet 20 in the retro-forming direction 23 or, alternatively, before the deep-drawing of the metal sheet 20.

The invention also concerns a bell 2 and a composite brake disc 1 obtained through the method described and/or having one or more grooves 22 with the characteristics described earlier.

Of course, a man skilled in the art can bring further modifications and variants to the method, to the bell and to the composite brake disc according to the present invention, in order to satisfy contingent and specific requirements, all of which are in any case covered by the scope of protection of the invention, as defined by the following claims.

The invention claimed is:

1. A method for manufacturing a composite brake disc, comprising:

shaping a support bell through deep-drawing of a metal sheet, the support bell being shaped as a cup having a coupling portion, a tubular side wall, and a bottom wall coupled to the tubular side wall, wherein the bottom wall and the tubular side wall are formed by pushing a circular portion of the metal sheet in a drawing direction relative to an outer portion of the metal sheet, thereby forming the bottom wall, the tubular side wall, and the coupling portion, the bottom wall being formed as having a crowned shape, the coupling portion formed from the outer portion and configured to connect the support bell to a brake band;

modifying the bottom wall to reduce a crowning in the crowned shape to result in the bottom wall having a flat shape by:

forming at least one of: a groove or a cavity in a surface of the bottom wall through a mechanical chip removal machining process, wherein a thickness of the bottom wall is locally reduced by a depth of the groove or the cavity, the depth of the groove or the cavity being less than one third of the thickness of the bottom wall; and pushing the bottom wall having the groove or the cavity on the surface relative to the outer portion of the metal sheet in a retro-forming direction to flatten the bottom wall and reduce the crowning, wherein the retro-forming direction is a direction opposite to the drawing direction; and connecting the brake band to the coupling portion of the support bell.

2. The method according to claim 1, wherein pushing the bottom wall relative to the outer portion of the metal sheet in the retro-forming direction further comprises imparting a dynamic impact on the bottom wall.

3. The method according to claim 2, wherein the dynamic impact is imparted on the bottom wall at a speed of forward movement of a punch of between 150 mm/s and 1000 mm/s.

4. The method according to claim 2, wherein the bottom wall is deformed during the pushing in the retro-forming direction so as to undergo a maximum axial displacement relative to the outer portion of the metal sheet between 2 mm and 5 mm.

5. The method according to claim 1, further comprising forming the groove or the cavity in an outer surface of the bottom wall facing in the drawing direction.

6. The method according to claim 1, wherein the groove or the cavity has a depth that is less than one fifth of the thickness of the bottom wall.

7. The method according to claim 6, wherein the groove has a width transversal to a longitudinal extension thereof and perpendicular to the depth, the width being within a range of 0.8 to 2.0 times the depth.

8. The method according claim 1, wherein the groove has an annular shape substantially concentric with a rotation axis of the support bell.

9. The method according to claim 1, wherein the bottom wall comprises connection holes, wherein the groove comprises two annular grooves concentric with a rotation axis, the two annular grooves comprising a first annular groove positioned outside and a second annular groove is positioned radially inside the connection holes.

10. The method according to claim 1, further comprising: applying an anti-corrosion treatment to the surface of the metal sheet, after the step of pushing the bottom wall relative to the outer portion in the retro-forming direction.

11. The method according to claim 1, wherein the cavity has a depth, a width and a length, wherein the width is comprised in a range from 0.8 to 2.0 times the depth, and the length is comprised in the range from 0.8 to 2.0 times the depth.

12. The method according to claim 11, wherein the cavity is a plurality of cavities that are uniformly distributed over a ring shaped area of the support bell.

13. The method according to claim 1, wherein the groove or the cavity is one of: a plurality of grooves or a plurality of cavities, a first one of the plurality of grooves or a first one of the plurality of cavities being positioned at a first distal end of the bottom wall, a second one of the plurality of grooves or a second one of the plurality of cavities being positioned at a second distal end of the bottom wall, the second distal end being an end opposite that of the first distal end.

14. The method according to claim 1, wherein the groove is one of a plurality of grooves formed in the bottom wall and distributed along a circumference around a rotation axis.

15. The method according to claim 1, further comprising forming the groove or the cavity in an inner surface of the bottom wall opposing in the drawing direction.

16. The method according to claim 1, wherein the cavity is one of a plurality of cavities uniformly distributed over a ring shaped area of the bottom wall in an array of cavities in a plurality of parallel rows.

17. The method according to claim 16, wherein the array of cavities comprises a first plurality of parallel rows of cavities and a second plurality of parallel rows of cavities.

18. A method for manufacturing a composite brake disc, comprising:

placing a metal sheet blank in a die, the metal sheet blank being circular with an outer portion;

shaping a support bell through deep-drawing of the metal sheet blank, the support bell being shaped as a cup having a coupling portion, a tubular side wall, and a bottom wall coupled to the tubular side wall, wherein the bottom wall and the tubular side wall are formed by pushing a circular portion of the metal sheet blank in a drawing direction relative to the outer portion of the metal sheet blank, thereby forming the bottom wall, the tubular side wall, and the coupling portion, the bottom wall being formed as having a crowned shape in the drawing direction, the coupling portion formed from the outer portion and configured to connect the support bell to a brake band;

modifying the bottom wall of the support bell in the die to reduce a crowning in the crowned shape to result in the bottom wall having a flat shape by:

forming at least one of: a groove or a cavity in a surface of the bottom wall through a mechanical chip removal machining process, wherein a thickness of the bottom wall is locally reduced by a depth of the groove or the cavity, the depth of the groove or the cavity being less than one third of the thickness of the bottom wall; and pushing the bottom wall having the groove or the cavity on the surface relative to the outer portion of the metal sheet blank in a retro-forming direction, wherein the retro-forming direction is a direction opposite to the drawing direction;

removing the support bell from the die; and connecting the brake band to the coupling portion of the support bell.

\* \* \* \* \*

UNITED STATES PATENT AND TRADEMARK OFFICE
CERTIFICATE OF CORRECTION

| | |
|---|---|
| PATENT NO. | : 10,458,495 B2 |
| APPLICATION NO. | : 14/350882 |
| DATED | : October 29, 2019 |
| INVENTOR(S) | : Massimiliano Valle |

Page 1 of 1

It is certified that error appears in the above-identified patent and that said Letters Patent is hereby corrected as shown below:

On the Title Page

(30) Foreign Application Priority Data: "Oct. 10, 2011 (EP) 11425246" should read -- Oct. 10, 2011 (EP) 11425246.3 --

Signed and Sealed this
Thirty-first Day of December, 2019

Andrei Iancu
*Director of the United States Patent and Trademark Office*